United States Patent [19]

Moore, III et al.

[11] Patent Number: 4,952,610

[45] Date of Patent: Aug. 28, 1990

[54] SOUND DAMPING COMPOSITION AND METHOD OF USING THE COMPOSITION

[75] Inventors: Dan T. Moore, III, Cleveland Heights; Edward A. Collins, Avon Lakes; Maurice E. Wheeler, Ashtabula, all of Ohio

[73] Assignee: Soundwich Incorporated, Cleveland, Ohio

[21] Appl. No.: 302,615

[22] Filed: Mar. 6, 1989

Related U.S. Application Data

[62] Division of Ser. No. 103,392, Oct. 1, 1987, Pat. No. 4,851,271.

[51] Int. Cl.[5] .............................................. C08G 18/14

[52] U.S. Cl. ...................................... 521/99; 521/137; 524/700; 525/185

[58] Field of Search .................. 521/99, 137; 524/700; 525/185

[56] References Cited

U.S. PATENT DOCUMENTS 4,792,574 12/1988 Berkowitz .......................... 521/137

*Primary Examiner*—Maurice J. Welsh

*Attorney, Agent, or Firm*—Pearne, Gordon, McCoy & Granger

[57] ABSTRACT

The invention concerns constrained layer sound damping. A composition and a laminated structure are provided for the reduction of noise coming from housings such as oil pans for automobiles. The composition comprises a rubbery polyurethane, an olefin polymer, and a filler. The laminated structure comprises the housing, the composition, and a sheet metal liner. The composition contains a blowing agent which is activated to provide a single unitary structure which dampens noise. The polyurethane and olefin polymer are thoroughly intermixed with each other, but maintain their separate identities in the blend.

6 Claims, 2 Drawing Sheets

SOUND DAMPING COMPOSITION AND METHOD OF USING THE COMPOSITION

This is a division of application Ser. No. 07/103,392, filed Oct. 1, 1987, now U.S. Pat. No. 4,851,271.

BACKGROUND OF THE INVENTION

The present invention relates to the use of a novel, relatively thin layer of a polyurethane/polyolefin composition constrained between a layer of sheet metal and a housing to dampen or suppress sound transmission in harsh conditions such as an automotive oil pan.

DESCRIPTION OF THE PRIOR ART

The prior art provides organic compositions filled with high density filler formulated for applications in inhibiting sound transmission, particularly engine noise. However, these known compositions are not suitable to dampen or suppress noise transmittal from or through housings or surfaces used in conjunction with internal combustion and diesel engines, particularly where the environment to which such surfaces are subjected is particularly harsh. In such applications, if the automobile manufacturer wishes to dampen vibrational noise, it can now use a heavier, more rigid housing or a sandwich made up of two formed sheet metal members in the order of 0.030 inch thick, with a specially formulated layer of viscoelastic composition between. With respect to oil pans, such pans have the special names of Antiphon pans and are characterized as dead metal fabrication pans.

U.S. Pat. No. 3,489,242 to Gladding et al. teaches, inter alia, an acoustic damping structure composed of a substrate adhered to a viscoelastic polymer such as a polyurethane elastomer, with at least 35% by volume of a filler having a specific gravity of at least 2.5 and a maximum dimension of 0.1 millimeter. The composition of this patent does not have an outer constraining layer and is intended for use in "free layer" damping.

The present invention is concerned with compositions which are employed in a constrained layer, by which we mean between a sheet or liner and the inner surface of the housing being dampened.

OBJECTS OF THE INVENTION

It is an object of the invention to provide a composition having sound dampening qualities and, in particular, having such qualities under harsh conditions such as the interior of oil pans used with internal combustion or diesel engines.

Another object of the invention is to provide a thin layer of a composition in conjunction with a housing and a thin sheet metal liner to form a unitary structure which dampens or reduces airborne and/or structurally transmitted noise, known as "pass-by noise."

SUMMARY OF THE INVENTION

An oil-resistant filled polyurethane composition is provided which comprises about (a) 30 to 70% by weight of at least one polyurethane; (b) about 10 to 30% by weight of an olefin polymer; and (c) from 0 to 35% by weight of at least one filler, e.g., inorganic filler.

A thin layer of this composition is disposed on one side of an internal surface joined to or in the vicinity of a noise source, such as an oil pan, valve cover, timing belt cover, and housings or enclosures of that sort. The other side of the composition is covered by a thin gauge sheet metal liner which matches the internal surface of the housing. There is a blowing agent in the composition which, when activated, expands the composition to cause it to be constrained and form a unitary laminated structure having increased sound dampening characteristics.

DETAILED DESCRIPTION OF THE INVENTION

Figure 1:
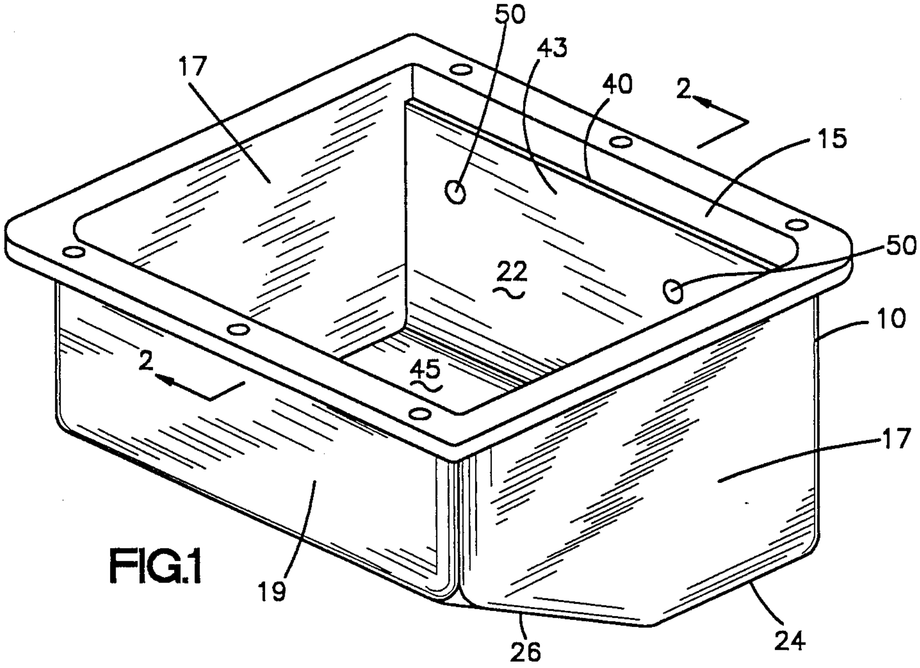
FIG. 1 shows a perspective view of an oil pan in accordance with the invention.

The composition of the present invention comprises, on a percent-by-weight basis, a major amount of at least one urethane polymer mixed with minor amounts of an olefin polymer, e.g., a propylene-ethylene copolymer, effective amounts of a filler, and preferably a chemical blowing agent. More specifically, the composition comprises about 30 to 70%, and preferably 45 to 65%, of a polyurethane, e.g., polyester urethane derived from a hydroxy-terminated polyester and an aromatic diisocyanate; about 10 to 30%, and preferably 15 to 25%, of an olefin polymer, e.g., propylene-ethylene copolymer; and 0 to 35%, and preferably from 15 to 35% of at least one filler. In the preferred embodiment, the composition also contains from about 0.1–5% by weight of a chemical blowing agent. Other processing additives which do not destroy or interfere with the desired characteristics may be added in effective amounts including such materials as carbon black, glass fibers, antioxidants, processing oil, etc.

The terms "urethane polymer" or "polyurethanes" for purposes of this invention include various polymeric urethanes which are resistant to motor oils, gasoline, or the like, and more specifically include the thermoplastic, rubbery, amorphous or elastomeric polymers derived from diisocyanates and amine or hydroxy-containing monomers such as hydroxy-terminated polyesters. Preferably, for purposes of this invention, the urethane polymers are derived from linear hydroxyl-terminated polyesters having molecular weights ranging between 800 and 2400, preferably 950 to 1500, and a diisocyanate, and particularly an aromatic diisocyanate such as diphenyl diisocyanate. The nitrogen content of the urethane ranges from about 3 to 5%, and preferably 3.8 to 4.5% by weight. These particular polyurethanes are characterized as polyester urethane elastomers, as more particularly described in U.S. Pat. No. 2,871,218, issued Jan. 27, 1959, the disclosure of which is incorporated herein by reference. These polyurethane elastomers can be further characterized as having a tensile strength of about 6000 lbs./sq. in., or higher elongations of 500 to 650%, and 300% moduli of 1000 to 1600. These particular urethane polymers are different from vulcanized cross-linked diisocyanate elastomers in that they are essentially free of cross-linking. The urethane products are thermoplastic and may be extended or molded, and may be melted to flow at high temperatures.

A preferred product is sold by the B. F. Goodrich Company under the trademark ESTANE 58277. Other suitable polyurethanes include the various polyester urethanes sold by B. F. Goodrich under the ESTANE trademark, such as ESTANE 58122, ESTANE 58206, ESTANE 58271, ESTANE 58092, ESTANE 58130, ESTANE 58134, ESTANE 58133, and ESTANE 58137. Other suitable similar urethane products are sold by Mobay Chemical Corp., Dow Chemical Company, and BASF under the trademark TEXIN, PELLETHANE, and ELASTOLLAN, respectively. Typical properties for ESTANE 58277 are given below:

| | |
|---|---|
| Shore Hardness | 50 D |
| Tensile Strength | 8000 psi |
| Tensile Stress @ 100% elongation | 1600 psi |
| Tensile Stress @ 300% elongation | 3500 psi |
| Ultimate Elongation | 450% |
| Stiffness @ 23° C. | 2100 psi |
| Vicat Softening Point | 198° F. |
| Compression Set | |
| 22 hrs. @ 23° C. | 18% |
| 22 hrs. @ 70° C. | 65% |
| Taber Abrasion, CS17 Wheel 1000 g Load, wt. loss/5000 cycles | |
| Tear Resistance | 600 lb/in |
| Split Tear | 150 lb/in |
| Specific Gravity | 1.21 |

The propylene-ethylene copolymer is a relatively stiff, intermediate or high impact polymeric resin. It can be either a random or block copolymer. The copolymers may contain less than about 15% by weight of the ethylene monomer.

A specific example of a suitable propylene-ethylene copolymer is Profax 8523, sold by Himont U.S.A., Inc., of Wilmington, Del. Another example of a suitable propylene-ethylene copolymer is NORCHEM NPP 7300-KF, sold by Northern Pethrochemical Company, of Omaha, Nebr.

The typical properties for PRO-FAX 8523 are given below:

| | |
|---|---|
| Melt flow rate, dg/min | 4 |
| Density, g/cm | 0.901 |
| Notched izod impact strength, ft-lbs/in. | |
| (J/m) at 73° F. (23° C.) | 7.1 (379) |
| at 0° F. (−18° C.) | 1.0 (53.4) |
| Tensile strength at yield, psi (MPa) | 2,900 (20.0) |
| Elongation at yield, % | 6.3 |
| Flexural modulus, psi (MPa) | 154,000 (1,065) |
| Rockwell hardness, R Scale | 68 |
| Deflection temperature at 66 psi (455 kPa), °F. (°C.) | 171 (77) |
| Drop-weight impact at −20° F. (−29° C.), ft-lbs (J) | |
| Texture up | 36.7 (49.8) |
| Texture down | 18.6 (25.2) |

The average molecular weight of PRO-FAX 8523 is about 360,000, with a range of 200,000 to 500,000.

The olefin polymers for purposes of this invention include the homopolymers, copolymers, and terpolymers of ethylene, propylene, and butylene. These polymers may have average molecular weights ranging up to about ten million, e.g., from about one hundred thousand up to five hundred thousand. It is important that the molecular weight be sufficiently high as not to be adversely affected by petroleum products, e.g., substantially insoluble in motor oil, etc.

We can employ various olefin homopolymers, such as propylene homopolymers, either alone or in combination with the propylene-ethylene copolymer, but it is more difficult to process such homopolymers. One homopolymer which can be employed is NORCHEM NPP 8020 GU, sold by Northern Petrochemical Company, of Omaha Nebr.

One or more polyurethanes or one or more olefin polymers can be used in various combinations. It is necessary, of course, to match the rheology of the polyurethanes and olefin polymers, e.g., propylene-ethylene copolymers, in order to mix or blend them together. The polymers are selected by melt index and viscosity and an attempt is made to match the melt indices in particular. The polyurethanes should have a melt index from about 1 to about 25. The olefin polymers, e.g., propylene-ethylene copolymers, should have a melt index of about 1 to about 20.

Fillers suitable for use in accordance with the present invention preferably should have a specific gravity in excess of 2, and include such compositions as calcium carbonate, barytes, barium sulfate, silicates, mica, slate flour, iron filings, soft clays, and the like. A suitable range for the specific gravity of the filler is 2.4 to 3.0. A preferred filler for this invention is talc (magnesium silicate).

Filler spheres, such as glass beads or plastic microballoons, e.g., polymeric spheres of polyethylene, may also be used in the present invention, with or without a blowing agent. The filler spheres in many respects are equivalent to the closed cells formed by a blowing agent. Filler spheres will have a much lower specific gravity than the above-specified ranges.

In the preferred embodiment of the invention, a blowing agent is included in the composition to cause expansion of the composition against the sheet metal liner to form a unitary structure and put the composition in constraint, as will be described in further detail. Preferable blowing agents are azodicarbonamide-type blowing agents such as made by Olin and sold under the trademark KEMPORE 200. Another suitable blowing agent is sold by Uniroyal under the trademark CELLOGEN AZ 120. The blowing agent is selected to allow processing of the composition without premature blowing. Blowing has to occur after the composition and liner are in place, e.g., during the paint cycle for the lubricant housing. The proper temperature and pressure conditions to cause the blowing agent to be activated and to subsequently expand the composition are referred to in this specification and claims as the "temperature of activation" for the blowing agent, and result in a unitary structure comprising the composition sandwiched between the housing and the liner. The thickness of the layer of composition after the blowing agent has been activated should be sufficient to fill the space between the housing and the liners. In most applications, this will be in the order of 0.030 to 0.060 inch. After the blowing agent has been activated, the density of the composition should be 0.3 to 0.7, and preferably about 0.4 or 0.5.

Other methods of achieving the unitary structure of the liner, composition and housing and putting the composition in constraint can be employed. For example, adhesive can be used on both sides of the composition layer, or a thick layer of composition could be used and the liner can be pressed into the composition when it is in a thermoplastic or malleable state.

Additional additives may be included which do not affect the prescribed qualities of the composition. For example, processing oil may be added. Suitable processing oils include paraffinic, aromatic, and naphthenic oils. These oils may be added in a range of about 0.1 to about 10% by weight.

Since the urethane and the olefin polymer components are not easily mixed together, these components are processed as follows: pellets of the polyurethane are mixed and melted with pellets of the propylene-ethylene copolymer and filler in an intensive mixer. This composition is formed into pellets which are then fed into an extruder to form a sheet. The blended composition is extruded into flat sheets and die-cut to form an appropriately shaped blank for the application. The urethane polymer, e.g., preferably the polyester urethanes, and olefin polymer are thus thoroughly mixed together. Measurements of the glass transition temperatures in a mixture of the two components and of the two components separately indicate that they are not mutually soluble in the blend but substantially maintain their separate identities in the blend. It is believed that this feature contributes to the unusual dampening characteristics of the composition of this invention.

In a preferred embodiment, a blowing agent is included in the composition in order to assure that it completely fills the void between the housing and the liner. The blowing agent may be added as a master batch comprising about 40% blowing agent dispersed in polyurethane in pellet form. The polyurethane, propylene-ethylene copolymer, and filler are placed into the extruder to make sheet. While there is some heat produced in the extruder, the temperature is maintained below the temperatures of activation of the blowing agent.

It is preferable to choose a blowing agent which is activated during the paint-bake cycle of the lubricant housing. Automobile oil pans are customarily baked for 20 minutes at 375° F. to bake the paint. As noted, the blowing agent is added as a master batch after the polyurethane and olefin polymer, e.g., propylene-ethylene copolymer, have been melt mixed together. The temperature in the extruder must be maintained below the activation temperature of the blowing agent. If an internal mixer is used, there must be cooling to compensate for heat which results from mechanical shearing. In order to avoid heat buildup, the composition including the blowing agent may be processed in a twin screw extruder or a ribbon blender and subsequently extruded in a sheet which is die-cut to form blanks.

The liner which is used with the composition is thin gauge drawing quality steel which is stamped or drawn to conform to the internal conformation of the housing member to be damped so that a suitable laminate can be formed.

FIG. 1 shows a lubricant housing 10, which is an oil pan in accordance with the invention. The oil pan 10 forms an internal cavity 15 having two side walls 17, a front wall 19, a rear wall 22, a bottom 24, and a bottom front face 26. The oil pan 10 is a standard oil pan which is not changed on the external surfaces as a result of the invention.

Figure 2:
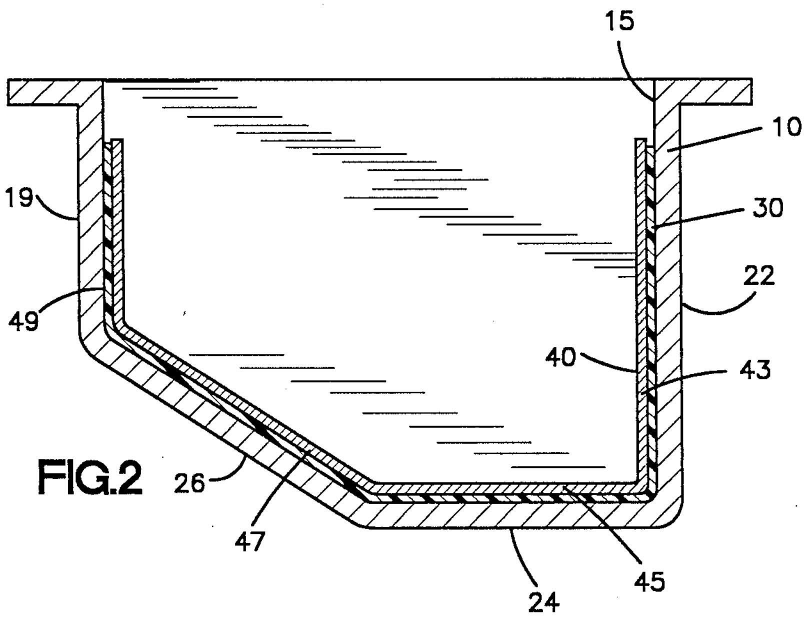
FIG. 2 shows a cross section of the oil pan taken along line 2—2 of FIG. 1.

A blank is prepared from a sheet of the composition 30, as previously described. The blank 30 corresponds in size to the internal housing surfaces to be treated. As shown in FIGS. 1 and 2, the blank is a continuous sheet which is adhered to a substantial portion of the rear wall 22, the bottom 24, the bottom front face 26, and the front wall 19 of the oil pan 10.

A liner 40 is formed of drawing quality cold-rolled steel, e.g., by stamping. The liner 40 corresponds in configuration to the internal surfaces of the housing. As illustrated in FIGS. 1 and 2, the liner 40 has a back wall 43, a bottom wall 45, a bottom front face 47, and a front wall 49. The liner 40 is 0.020-0.07 inch thick, and preferably 0.03 inch thick. The layer of composition before it is expanded by the blowing agent is of comparable thickness.

The liner 40 may be adhered to the composition layer 30 by the adhesiveness of the composition alone, or the liner 40 may be adhered to the oil pan 10 by spot welds 50 in the front and back walls 49, 43.

The oil pan 10 is subsequently heated, such as during a paint-bake cycle, to cause the composition 30 to expand so that it completely fills the space between the liner 40 and the oil pan 10. Of course, in this embodiment, the liner and the internal configuration of the oil pan must be sufficiently close in size and shape that the composition will fill the area between them when it is expanded. Typically, a paint-bake cycle occurs at 325°-375° F. for 15 to 30 minutes.

The application of the sound-dampening composition and liner to the inside of the lubricant housing permits the usual handling of the housing during manufacture of the machine. It does, however, necessitate that the composition be lubricant-resistant in the sense that it will withstand constant, long-term exposure to heated lubricant without significant degradation. Such lubricant resistance may be measured, for example, for oil by an oil soak test in which a sample of the constrained laminate is immersed in aerated 10-W-30 oil at 300° F. for six weeks. Oil resistance may then be judged at the edges of the composition sample by visual inspection for change of color or texture, significant swelling, adhesion loss, or other indications of degradation.

The invention is demonstrated for use with an oil pan. In this case, the noise to be damped will be at a frequency of 50-250 Hz. More specifically, the automotive industry in the United States is concerned with damping noise between 150 Hz and 250 Hz, and in particular at 187.5 Hz. The Japanese auto industry is concerned, however, with damping oil pan noise at about 100 Hz. When used with a valve cover, the invention should inhibit higher frequency noise between 1000 and 5000 Hz. The composition is formulated for the proper frequency and temperature at which it is to be employed in service conditions. Specifically, the amount and/or type of polymer, filler, and foam density are selected to "tune" the composition to the frequency ranges to be dampened.

As has been mentioned, the composition of the invention must be effective at sound damping at the operating temperature. If the invention is practiced with an oil pan, the composition should be effective at damping the desired frequency noise at about 230° F. ±5° F. If, on the other hand, the invention is practiced with a valve cover, the operating temperature will be closer to about 180° F. ±5° F.

For oil pan applications, the constrained polymeric layer in the laminate must fulfill the following criteria: (1) it must withstand six-week immersion in 10W-30 aerated oil at 300° F.; (2) it must meet standard ASTM adhesion tests for adhesion to metal surfaces and withstand at least 5 pounds force at 1 inch per minute test speed before and after oil immersion; (3) swelling from oil immersion at 300° F. for six weeks must be limited to 1%; and (4) it must have a shore A hardness of 70-80 before oil soak. Additionally, the unexpanded polymeric composition, prior to any oil soak, should have the following properties: (1) the tear strength must be a minimum of 100 lbs./in. at 20 inch/minute test speed; (2) it must have a minimum modulus of 350 psi; (3) it must have a minimum elongation of 200%; and (4) it must have a minimum tensile strength of 700 psi.

It should be noted that in the laminated structure of the invention, the oil makes contact with the polymeric urethane-containing composition only at the edges of the laminate. The liner shields most of the polymeric composition from direct contact with the oil. Also, after the paint/bake cycle, the composition adheres to the oil pan and to the liner. The oil does not infiltrate between the composition and the liner or between the composition and the oil pan. The only contact by the composition with the oil, as noted, is at the edges of the laminate.

In order to determine the noise loss factor in the examples that follow, an Oberst test was performed. Reference to the Oberst test in the specification and claims refers to the following test: An Oberst panel of 300 mm ×20 mm ×0.8 mm was used and a single 280 mm ×20 mm ×0.8-1.0 mm sheet of the test composition was laminated to the Oberst panel and a comparable size sheet of drawing quality rolled steel was laminated to the test composition to form a sandwich of test composition. Where it is indicated that two test compositions were layered, two sheets of different test compositions were laminated together, but the thickness of the laminate was kept constant. The steel panels were riveted through the test layer to the Oberst panel using two rivets. If necessary, a thin layer of pressure-sensitive adhesive was used to aid in the adhesion of the test composition to the metal. Noise loss was measured as compared to the Oberst panel alone. Inhibition of sound is measured as loss of sound in Oberst units. The loss factor was determined at 200 Hz.

Figure 3:
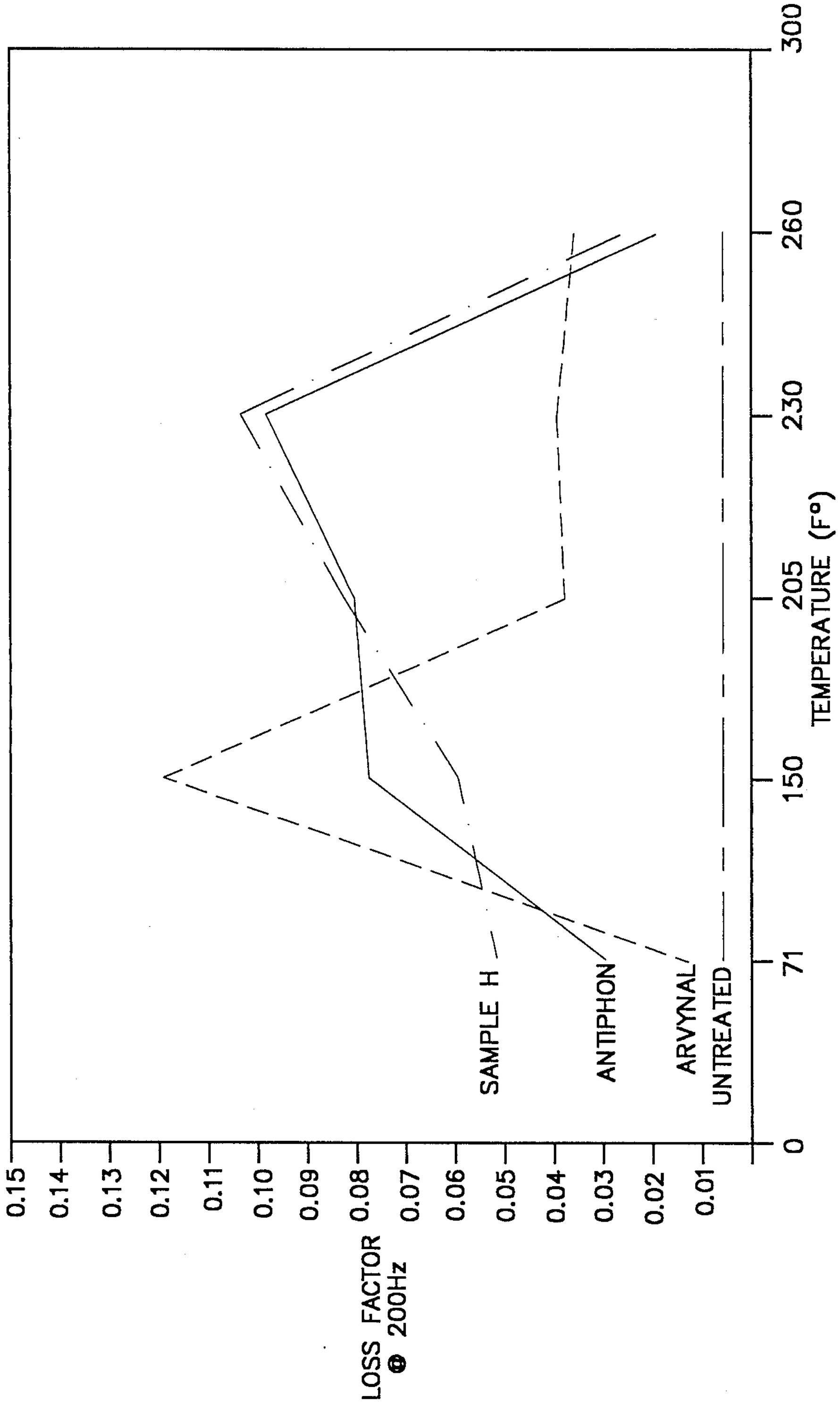
FIG. 3 shows sound transmission loss factor at 200 Hz as a function of temperature for an oil pan made in accordance with this invention compared to the Antiphon and Arvynal dead metal oil pans now in use.

FIG. 3 demonstrates the composition of the present invention (Sample H) as contrasted to sound deadening materials currently used or available in the automotive industry. As noted, these latter materials, Antiphon and Arvynal, are filled metal composites known in the industry as "dead metals." Arvynal is significantly less effective at the relevant operating temperatures than the laminate of the present invention. Antiphon does not have good structural strength, and it is expensive.

Table I contains examples of compositions which are acceptable sound dampeners at the appropriate frequencies and temperature. In particular, samples G, H, and I show favorable results. The Oberst test was performed using composition and metal liner laminated to the Oberst panel according to the previous description. Since these compositions included blowing agent in accordance with a preferred embodiment, the percent volume expansion was measured for a 30-minute, 375° F. bake cycle. These conditions compare to the usual paint-bake cycle for an oil pan.

TABLE I

| | Sample Compositions (Percent by Weight) | | | | | | | | |
|---|---|---|---|---|---|---|---|---|---|
| | (A) | (B) | (C) | (D) | (E) | (F) | (G) | (H) | (I) |
| Estane 58277 (polyester urethane) | 73.0 | 73.0 | 72.1 | 65.4 | 57.4 | 46.0 | 57.4 | 59.3 | 58.1 |
| Pro-Fax 8523 (propylene-ethylene copolymer) | — | — | — | — | 20.0 | 25.2 | 14.6 | 14.0 | — |
| Norchem NPP (polypropylene) | — | — | — | — | — | — | — | — | 15.0 |
| Filler (talc) | 24.0 | 24.5 | 24.2 | 21.8 | 19.3 | 25.0 | 24.3 | 23.4 | 24.0 |
| Process Oil | 1.0 | 0.5 | 1.0 | 1.0 | 1.0 | 1.0 | 1.0 | — | — |
| Kempore 200 | 0.5 | 0.3 | 1.0 | 1.0 | 1.0 | 1.0 | 1.0 | 1.0 | 1.0 |
| Vulcup | 0.3 | 0.5 | 0.5 | — | — | — | — | — | — |
| Agerite MA | 0.8 | 0.8 | 0.8 | 0.8 | 0.8 | 0.8 | 0.8 | 0.4 | 0.4 |
| Black B 22106 | 0.5 | 0.5 | 0.5 | 0.0 | 0.5 | 0.8 | 1.0 | 1.9 | 1.5 |
| Glass Fibers | — | — | — | 10.0 | — | — | — | — | — |
| % Volume Expansion 30-minute bake at 350° F. | 91.0 | 57.0 | 64.00 | 38.0 | 87.0 | 54.0 | 75.0 | 68.0 | 52.0 |
| Oberst RT (200 Hz) | .11 | .11 | .12 | .12 | .11 | .05 | .11 | .05 | .04 |
| 150° F. | .06 | .07 | .09 | .08 | .08 | .07 | .09 | .06 | .05 |
| 200° F. | .07 | .07 | .06 | .07 | .10 | .10 | .10 | .08 | .06 |
| 230° F. | .05 | .05 | .06 | .05 | .04 | .05 | .11 | .11 | .09 |
| 260° F. | .02 | .01 | .02 | .02 | .02 | .02 | .04 | .03 | .04 |

Kempore 200 is a blowing agent sold by Olin Chemicals. Vulcup is a trademark for bisperoxide sold by Hercules Incorporated. Agerite MA is a trademark for an antioxidant sold by R. T. Vanderbilt Co. Black B22106 is the trademark for an olefin-based coloring agent sold by Polycom Huntsman.

In Table II, a comparison is made of the sound dampening characteristics, measured as a loss factor at 200 Hz as a function of temperature for laminates of known compositions. This Table demonstrates that the sound dampening characteristics of the polyurethane and olefin, i.e., propylene-ethylene copolymer compositions of this invention, separately and together, are quite different and that a filler is desirable. Compare samples 1 and 7 with sample 6 for the latter proposition.

TABLE II

| | Effect of Filler, Resin Blends, and Construction on Sound Properties Oberst @ 200 Hz | | | | | | |
|---|---|---|---|---|---|---|---|
| | (1) | (2) | (3) | (4) | (5) | (6)* | (7)* |
| Estane 58277 (polyester urethane) | 60.0 | 97.0 | — | 74.0 | — | 48.5 | 36.5 |
| Pro-Fax 8523 (propylene-ethylene copolymer) | 14.0 | — | 97.0 | — | 74.0 | 48.5 | 36.5 |
| Filler (talc) | 23.0 | — | — | 23.0 | 23.0 | — | 24.0 |
| Black B22106 | 1.5 | 2.0 | 2.0 | 2.0 | 2.0 | 2.0 | 2.0 |
| Kempore 200 | 1.0 | 1.0 | 1.0 | 1.0 | 1.0 | 1.0 | 1.0 |
| Agerite MA | .5 | — | — | — | — | — | — |
| Oberst RT °F. | .05 | .078 | .016 | .08 | .023 | .072 | .045 |
| 200 Hz 150° F. | .06 | .048 | — | .057 | .01 | .044 | .067 |
| 205° F. | .08 | .050 | .028 | .068 | .023 | .092 | .093 |
| 230° F. | .105 | — | — | — | — | .098 | .08 |
| 260° F. | .027 | — | — | — | — | .127 | .097 |
| Sheet Weight (lbs./sq. ft.) | .12 | .09 | .09 | .13 | .12 | .12 | .14 |

*These samples comprised separate superimposed layers of Estane 58277 and Pro-Fax 8523, in a metal laminate.

The noise reduction for oil pans made in accordance with the present invention as compared to a standard production Antiphon dead metal oil pan was tested as a function of engine r.p.m. at oil temperatures of 205° F., 225° F. The engine tested was a 1986 Chrysler 2.5 liter engine without pistons, connecting rods, intake or exhaust manifolds, or other accessories. The ports were sealed. Solid cast rocker arms were used. The engine was motored by a dynometer. The production timing belt was at 70 pounds of belt tension. An acoustic blanket covered the engine above the oil pan. Measurements were taken in a sound and vibration-quiet room.

The samples made according to the invention used a similar oil pan with a unitary construction of a sandwich of a 0.03 inch layer of composition corresponding to Example H of Table I, and a 0.03 inch steel liner spot welded to the bottom and sides of the oil pan.

Three type 4145 microphones having a one-inch condenser were used in testing each oil pan. The microphones were placed as follows:

| | |
|---|---|
| Rear wall: | 11 inches from the rear of the block (trans end); 3 inches from the rear surface (car position) of the oil pan in the center and facing the rear surface |
| Bottom wall: | 11 inches from the rear of the block; 3 inches from the bottom surface of the oil pan |
| Bottom front face: | 11 inches from the rear of the block; 3 inches from the bottom front face (car position) |

The standard oil pan was tested three times and the data averaged. Three identical oil pans made in accordance with the invention were tested.

The results of the tests for the bottom front face microphone at each temperature, for the bottom wall microphone for each temperature, and for the rear wall microphone were averaged.

The engine speed was constantly varied from 600 to 1200 r.p.m., and the tests were run for 5000 hours to simulate the life of a car.

The oil pans made in accordance with the invention had significantly lower noise levels than the standard oil pans. Over time, there was very little reduction in the ability of the oil pans of the present invention to lower noise levels. Oil did not harm the composition at various operating temperatures.

The oil pans on most automobiles are stamped and therefore have a tendency to resonate. On the more expensive automobiles, however, such as BMW, Mercedes, and Jaguar, the oil pans are cast and are stiffer and resonate much less. Oil pans made in accordance with the invention achieve higher stiffness and more effective damping, which brings them closer in characteristics to cast oil pans. The Antiphon and Arvynal oil pans are an attempt to obtain the characteristics of cast oil pans. An additional advantage of the present invention is that an oil pan made in accordance therewith costs approximately one-half as much as an Antiphon or Arvynal oil pan, and quite a bit less than a cast oil pan, and yet is almost as effective.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A constrained layer sound damping composition for use in damping noise in the frequency range of about 50 Hz to about 5000 Hz transmitted from or through a housing surface comprising:
   (a) from about 30 to 70% by weight of at least one urethane polymer;
   (b) from about 10 to 30% by weight of an oil-insoluble olefin polymer; and
   (c) from about 0 to 35% by weight of at least one filler, said urethane polymer and said olefin polymer being thoroughly intermixed with each other but substantially maintaining their separate identities in the composition mixture.

2. A sound damping composition as set forth in claim 1, in that the filler ranges from about 15 to 35% by weight, said filler having a relative density of about 2.4 to about 3.0.

3. A sound damping composition as set forth in claim 1, further comprising from about 0.1% to about 5% by weight of a blowing agent having a temperature of activation of about 330° F. to about 400° F.

4. A sound damping composition as set forth in claim 1, wherein said urethane polymer is a polyester urethane having a melt index of from about 1 to about 25 and said olefin polymer is a propylene-ethylene copolymer having a melt index of from about 1 to about 25.

5. A sound damping composition for damping noise in the frequency range of about 50 Hz to about 2500 Hz transmitted from or through an automotive housing surface adapted to be in contact with a petroleum-derived lubricant, comprising:

(a) from about 30% to about 70% by weight of at least one rubbery polyester urethane having a melt index of about 1 to about 25;

(b) from about 10% to about 30% by weight of a propylene-ethylene copolymer having a melt index of about 1 to about 25;

(c) from about 15% to about 35% by weight of a filler having a relative density of about 2.4 to about 3; and (d) from about 0.5% to about 5.0% by weight of a blowing agent having a temperature of activation of about 330° F. to 400° F. said composition being resistant to degradation after immersion for six weeks in a petroleum-derived lubricant at about 300° F. and being effective in damping noise in the frequency range of about 50 Hz to about 5000 Hz at a temperature of about 150° to about 350° F., said composition being able to be formed in a sheet and said sheet being able to adhere to said surface, said polyester urethane and said copolymer being thoroughly intermixed with each other but substantially maintaining their separate identities in the composition mixture.

6. The composition of claim 1, further characterized in that the urethane polymer is a polyester urethane derived from a hydroxy-terminated polyester and an aromatic diisocyanate.

* * * * *